United States Patent

Flowers

[15] 3,649,771

[45] Mar. 14, 1972

[54] VF PUSHBUTTON SIGNALING ARRANGEMENT

[72] Inventor: Thomas Harold Flowers, Mill Hill, London, England

[73] Assignee: International Standard Electric Corporation, New York, N.Y.

[22] Filed: Aug. 8, 1969

[21] Appl. No.: 848,538

[30] Foreign Application Priority Data

Aug. 15, 1968 Great Britain ......................39,005/68

[52] U.S. Cl. ..........................................................179/84 VF
[51] Int. Cl. ..........................................................H04m 1/50
[58] Field of Search ...............................................179/84 VF

[56] References Cited

UNITED STATES PATENTS 3,319,011 5/1967 Maurushat.........................179/84 VF

*Primary Examiner*—Kathleen H. Claffy
*Assistant Examiner*—William A. Helvestine
*Attorney*—C. Cornell Remsen, Jr., Walter J. Baum, Percy P. Lantzy, J. Warren Whitesel, Delbert P. Warner and James B. Raden

[57] ABSTRACT

This relates to "guard" arrangements for a VF receiver, especially for handling 2 × (1 out of 4) code signals from pushbutton subscriber sets. It is shown that if signals from a high-impedance source are applied to an infinite series of resonant circuits whose resonances are in geometrical progression, a guard voltage derived from the input to the infinite series can be opposed to the signal frequencies at the output and gives adequate guard against spurious signals such as speech, without the use of input band-stop filters or of resonant circuits having a precise Q value, as used in known guard circuits.

3 Claims, 19 Drawing Figures

VF PUSHBUTTON SIGNALING ARRANGEMENT

This invention relates to signal imitation guard circuits for use in voice frequency signalling systems.

According to the present invention there is provided a signal imitation guard arrangement for a receiver in a voice-frequency signalling system using frequencies selected from two bands of frequencies, in which said receiver includes in its input stage a high-output impedance amplifier feeding in parallel a pseudo-infinite series of resonant circuits which includes signal circuits each resonant at one of the frequencies used in signalling, in which inputs to the receiver produce a guard voltage derived from the alternating voltage appearing across the input to the pseudo-infinite series of resonant circuits which guard voltages are opposed to the signal voltage appearing across the output of said signal resonant circuit.

According to the present invention there is also provided a signal imitation guard arrangement for a receiver in a voice-frequency signalling system using for each signal two frequencies one from each of two bands of four frequencies having a common ratio between adjacent frequencies, in which said receiver includes in its input stage a high impedance amplifier feeding in parallel a series of resonant circuits which include circuits each resonant at a different one of the frequencies in said two bands of frequencies, a circuit resonant at the frequency which is the geometric mean of the lowest frequency of the higher frequency band and the highest frequency of the lower frequency band, circuits resonant at the next frequency below the lowest frequency of the lower frequency band, and circuits resonant at the next frequency above the higher frequency band, in which a guard voltage for a given frequency is derived from the alternating voltage appearing across the appropriate resonant circuit and is opposed to the signal voltage appearing across the output of said appropriate resonant circuit.

An embodiment of the invention is described below with reference to the accompanying drawings of which:

FIGS. 1 to 5 are guard arrangements already known.

FIG. 6*a* is a typical circuit used in the arrangements of FIGS. 1 to 5 and

FIG. 6*b* shows response curves of such a typical circuit.

FIG. 7*a* is a circuit as used in the present invention.

FIGS. 7*b* and 7*c* are response curves for such a circuit for two different values of Q.

Figures 10, 12, 15:
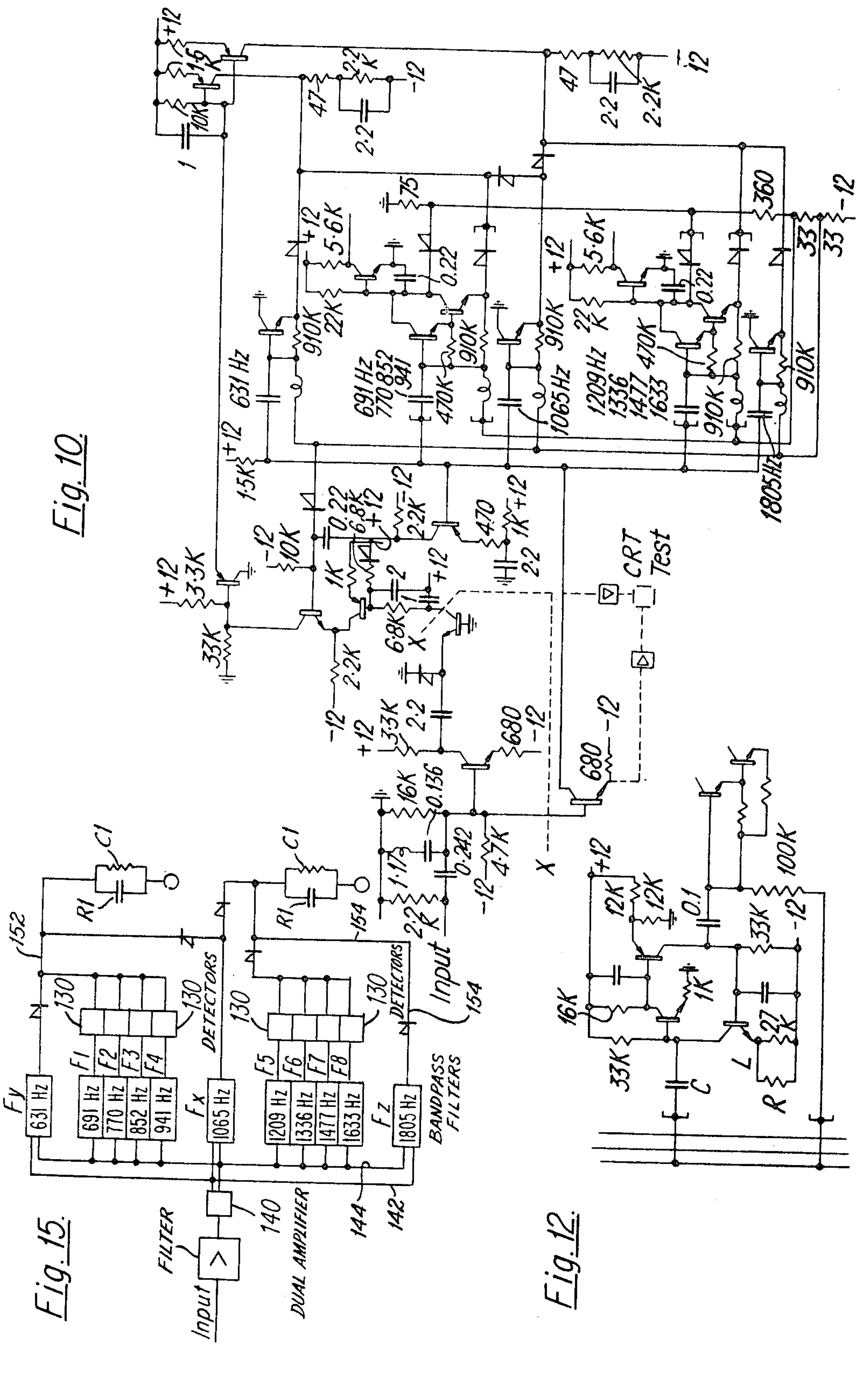
FIG. 10 is the circuit diagram of a receiver according to the invention.
FIG. 12 is the circuit diagram of a discrete component gyrator which can be used to replace inductors in the receiver of FIG. 10.
Figure 13A:
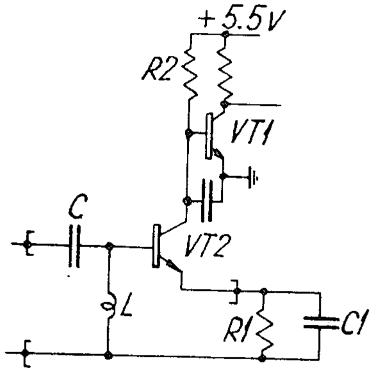
Figure 13B:
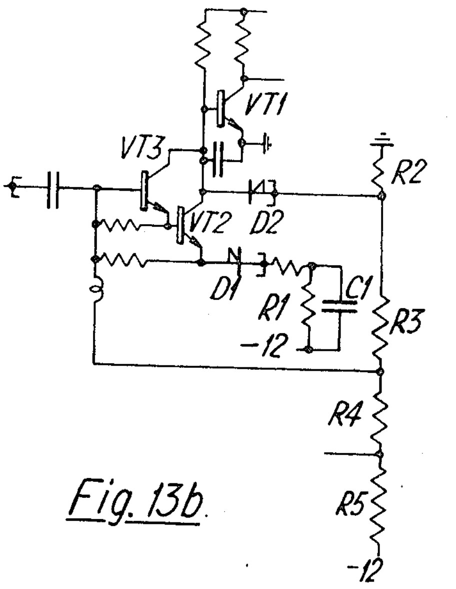

FIGS. 13*a* and 13*b* show some details of detector circuits for use in the receiver of FIG. 10.

Figure 14:
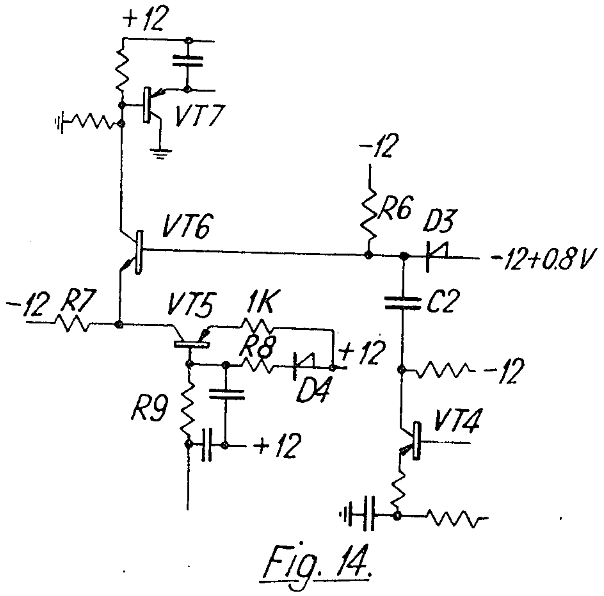

FIG. 14 is the circuit diagram of the guard circuit of the receiver of FIG. 10, and FIG. 15 is the block diagram of the circuit of the receiver of FIG. 10.

The receiver described herein is designed to receive the standard international press-button v.f. signals comprising two groups of four frequencies 697, 770, 852, 941 Hz. and 1209, 1336, 1477, 1633 Hz., a complete signal consisting of two frequencies, one out of each of the groups.

The frequencies in each series are in geometrical progression with a common ratio of 1.105. Each series extended into the other produces frequencies which fall between those of the other series so chosen that harmonics of the signal frequencies and products of modulation of pairs of frequencies, one from each band, fall between and not at signal frequencies.

Difficulties in the design of receivers for push button V.F. signals fall mostly into one of the following categories:

1. The wide range of signal levels and differences in levels as they appear at the input to the receiver caused by variations in the frequency generators and in the exchange lines connecting the generators to the exchange. The levels at different frequencies can vary nearly 20db. and the differences in level of two frequencies of one signal can be up to 6db. 2. The fact that the signals are transmitted inband means that signal imitation is possible through users speaking into the transmitters when the receivers are connected for the reception of number signals. Speech at these times is not a normal situation but it is not impossible nor can the telephone users be so controlled as to avoid the dangerous situation. The effect of signal imitation is to produce a wrong number which in addition to being annoying may also in public service result in a charge for the call. Charging does not occur on PABX calls which relaxes the requirements of the receivers to some extent. 3. Fast operation of the receiver is essential because of the rapid rate at which some users can operate the push buttons. A maximum response time of 40 milliseconds is usually assumed which provides little latitude for guarding against signal imitation by delaying the response of the receiver. 4. Interference with the operation of the receiver can occur because of extraneous inputs of which dial tone causes the most difficulty. When a button is pressed the microphone is switched out of circuit in order to prevent interfering currents from that source. Hence although there may be some hang-over effects from interference from the instrument end, no great difficulty is encountered. From the exchange end it is necessary to send dial tone before push-button sending can commence. Some of the dial tone, no matter how it is sent, is reflected back into the receiver and its level may exceed that of the incoming signals. Discrimination is possible only on a frequency basis.

Figure 1:
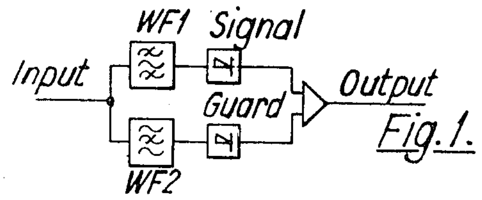
Fig.1. PRIOR ART
Figure 2:
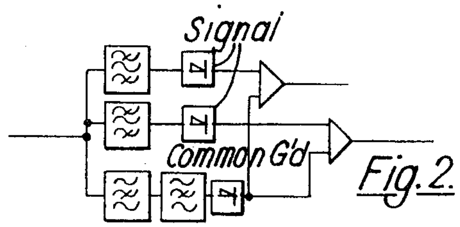
Fig.2. PRIOR ART

A single frequency signal is very satisfactorily received by the system of FIG. 1. The input to the receiver is applied to two filters, WF1 which passes the signal frequency and WF2 which stops the signal frequency. The outputs from the filters are rectified and compared as to magnitude, a signal being detected if the ratio of the signal to the guard output exceeds some predetermined figure. The power of the guard circuit is limited only by the harmonics of the signal frequency and the characteristics of the bandstop filter WF2 such that the guard must not prevent a genuine signal being received. In practice signal imitation may almost but not quite be prevented: no more than one false operation lasting 30 milliseconds or so during 100 hours of speech is possible. A number of signals at different frequencies, but never more than one occurring at the same time, can be detected by a set of equipments according to FIG. 1, one for each frequency with their inputs commoned, which tends to be expensive. Alternatively, as shown in FIG. 2, a common guard circuit comprising all the bandstop filters in series can be used which although no cheaper than the first arrangement is capable of receiving more than one frequency signal at a time. There is obviously, however, a diminution in the effectiveness of the guard circuit. Practical difficulties arise with the systems of FIG. 1 and 2 when the range of input levels exceeds 10db. or so because of overloading of the amplifiers or the detectors on high level signals if there is sufficient sensitivity to receive low level signals. A solution to this difficulty is a compressing amplifier at the input to the receiver which reduces the level variations to a range which the detector circuit can handle. Problems are presented by a compressing linear amplifier which sometimes prevent its being used. First, the control of the gain must have some time constant to bridge the variations in envelope so that the gain is set by the long term mean level of the input. If a signal comprising two frequencies $f1$ and $f2$ can occur, its envelope varies in amplitude between the sum and the difference of their individual amplitudes and at the difference frequency $f1-f2$ the period of which must be not more than about one third that of the time constant of the gain control circuit. This may make the gain control too slow to respond to the signals. Second, when there are large differences of level between components of a signal, the gain is set by the largest and can so reduce the smallest that it is unable to operate its detector circuit. If the output to the detector circuit has to be raised by $x$ db. in order to be effective and the compression ratio is $r$ then the input must be raised by $x$ multiplied by $r$ db. which often becomes impossible.

Figure 3:
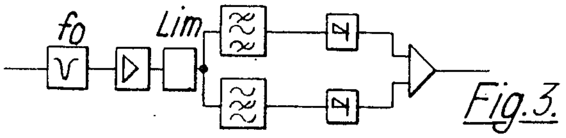
Fig.3. PRIOR ART
Figure 4:
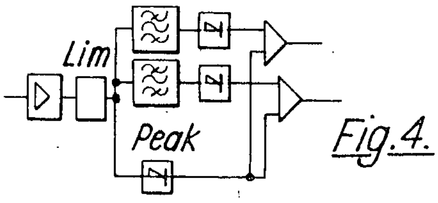
Fig.4. PRIOR ART
Figure 5:
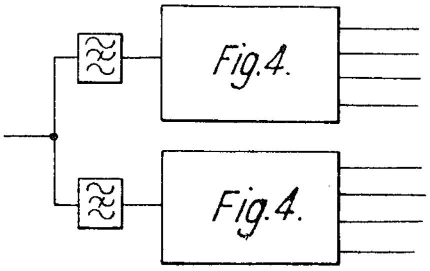
Fig.5. PRIOR ART

Because of the difficulties caused by level variations the alternative system shown in FIG. 3 is frequently used. This comprises the circuit of FIG. 1 preceded by a network described later, an amplifier and a limiter which reduces all sinusoidal signals to square waves of amplitude independent of the input amplitude but still containing the input frequencies. The effectiveness of the guard is reduced by the harmonics of the signal frequency which are produced by the limiting, some of which loss can be regained by the previously mentioned network at the input which attenuates the signal frequency relative to other frequencies. It is not possible to apply this system to more than one frequency at a time as in FIG. 2 because of the distortion produced by the limiter. Reception of a number of frequencies one at a time is possible by the provision of apparatus according to FIG. 3 for each frequency and commoned at their inputs. Alternatively, a common input network attenuating all the signal frequencies and followed by an amplifier and limiter to the output of which all the signal and guard circuits are paralleled, may be used with some further diminution in the guarding because of the many frequencies attenuated by the input network which is usually omitted as not being worth the considerable expense. Also a guard circuit per frequency is expensive for which reason the arrangement of FIG. 4 is the more usual one, in which a common guard detecting the peak amplitude of the output from the limiter is compared with the outputs from the signal circuits. Clearly the guarding action is still further reduced so that to obtain satisfactory signal protection against signal imitation some further guarding action is necessary. Time delay is limited for a push-button VF receiver because of the short duration of the signals. A signal requiring the simultaneous existence of two signal frequencies is a powerful method of reducing signal imitation, but prohibited to FIG. 4. The twice times one-fourth system universally adopted has been chosen with the foregoing difficulties and problems in mind. By using two non-overlapping groups of four frequencies it is possible to construct two groups of detector circuits such as FIG. 4 and to connect each to the receiver input via a bandstop filter as shown in FIG. 5, the filter connected to one group eliminating the frequencies of the other group. Mutual interference between the frequencies is thereby avoided. The protection against signal imitation of each group separately is less than that of FIG. 4 because of the input bandstop filters but the overall immunity to signal imitation is increased because an effective signal is dependent upon the simultaneous existence of an output from one of the frequencies in each group.

Figures 6A, 6B, 7A, 7B, 7C, 8:
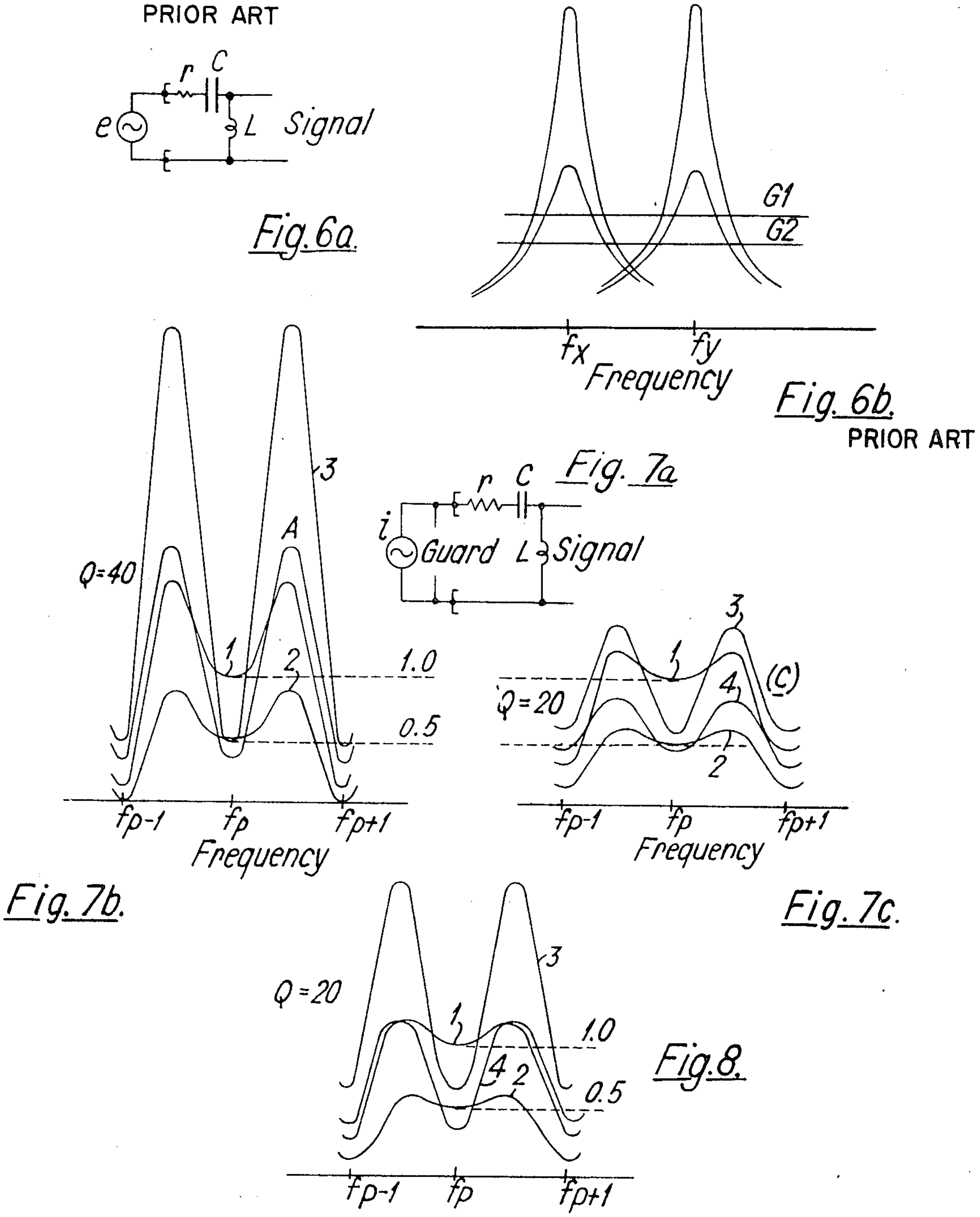
FIG. 8 is the improved response curve of the circuit of FIG. 7*a*.

Because the ratio of one frequency to the next in multifrequency VF receivers is rather small (1.105 in the present case) and also because of the necessity for minimum cost and size, the signal filters are usually simple tuned circuits of high Q. FIG. 6*a* is a typical circuit arrangement wherein a constant voltage signal amplifier (e.g. limiter in FIG. 4) supplies paralleled LC resonant circuits one for each frequency. The responses (volts across inductances) for two signal circuits are shown in FIG. 6*b* for Q values of 50 and 25. The guard voltage derived from the peak voltage of the input $e$ assuming only one frequency at a time may have a maximum value G1 determined mainly by the minimum bandwidth and a minimum value G2 determined by the tolerances. Bearing in mind that the tuned circuits are themselves subject to manufacturing tolerances resulting in the tuned frequencies being uncertain to 0.25 percent and that the Q values of the inductors vary with frequency as well as with manufacture, either the bandwidth response must be allowed wide tolerances or each tuned circuit and detector must be individually adjusted which is undesirable in manufacture.

Figure 9:
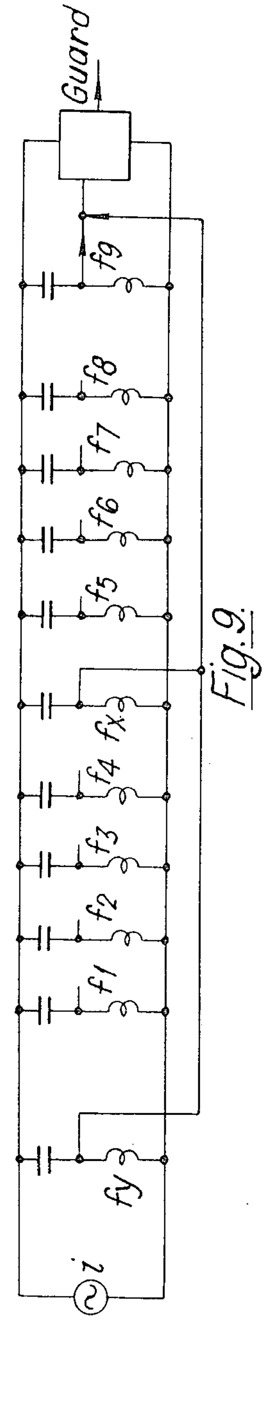
FIG. 9 is a parallel arrangement of series resonant circuits forming a pseudo-infinite series of resonant circuit.

The approach used in the present receiver is illustrated in FIG. 7*a*. The signal source is a linear amplifier of high internal impedance (constant current) feeding the tuned circuits in parallel. The signal detectors are operated by the voltages across the inductors, or preferably by the current in the tuned circuits, and the guard is derived from the voltage of the source. Suppose an infinite number of circuits of resonant frequencies in geometrical progression to be used for a receiver designed to receive two frequencies simultaneously, the guard voltage to be derived from the input to the tuned circuits and the maximum difference in received level between the two frequencies to be 6db., then FIGS. 7*b* and *c* represent, for two values of Q of the tuned circuits, the maximum amount of guard which can be used to oppose the signal voltages assuming the sum of the tolerances of the generated frequencies and the receiver tuning to be ± 2 percent. The curves are normalized so that one signal voltage, curve 1, has the value unity at the resonant frequency. It is to be understood that, using a logarithmic frequency scale, FIGS. 7*b* and *c* represent all the frequencies in the series. Curve 1 represents the output against frequency for one of the frequencies and curve 2 the output for an input which is 6db. lower than that of curve 1. The guard voltages which are the result of two frequencies, which may vary independently of one another give rise to an infinite number of combinations. To produce the guard the alternating voltage across the input to the tuned circuits is amplified and rectified to oppose the signal voltages. The rectified output can vary from the mean to peak-to-peak of the alternating input depending on the design of the rectifier. Peak-to-peak value is preferred as being more effective in distinguishing between signal and speech inputs, hence the guard voltage for two inputs at different frequencies is proportional to the sum of their amplitudes. Curves 3 in FIG. 7 represent the guard voltages resulting from two frequencies of equal amplitude centered on signal frequencies and varying in frequency together and curve 4 one frequency fixed at around a signal frequency and a second 6db. higher in level and varying in frequency. Curves 2 and 4 together represent the most difficult conditions under which the smaller of two frequency inputs has to operate and are contrived to permit the ± 2 percent tolerance in frequency which is necessary. Curve 3 follows from the assumptions made for curve 4 and in conjunction with curve 1 shows the worst operating conditions for two equal level frequency inputs: even under the worst conditions operation occurs over a wider band than ± 2 percent. It is clear from FIGS. *b* and *c* of FIG. 7 that the effectiveness of the guard is dependent on the Q of the resonant circuits and if the Q is high enough the guard will be adequate and allow any two frequencies to operate simultaneously which includes the operating conditions for a twice times one-fourth receiver. The requirement for satisfactory operation becomes dependent on a minimum Q rather than a precise one as in FIG. 6 and the circuitry is simplified to the extent that input bandstop filters are no longer required. However, two other problems are presented. The guard circuit is dependent for its correct action around the signal frequencies on there being little distortion of the signal as received over the line. Limiters cannot therefore be used to help to accommodate the wide level variations which occur at the input to the receiver, and some form of compressor may be necessary which does not introduce any appreciable amount of distortion. The second problem concerns the tuned circuits, the eight required for the actual signal frequencies not being an infinite series. A practical solution to this problem is shown in FIG. 9. The gap between the two series of frequencies is little more than the equivalent of one missing frequency in the infinite series so that one tuned circuit resonant at the geometric mean frequency fx between the highest frequency in the lower band and the lowest frequency in the upper band produces a series for the two bands which is near enough to being continuous so far as the purpose requires. Two extra tuned circuits of frequencies *fy* and *fz* in the series and adjacent to the nine already existing frequencies extend the series but there is still some end effect because of the missing tuned circuits on each side of the series. If the outer end tuned circuits are duplicated (which means halving the inductance values and doubling the capacitors) then they are a sufficient approximation to an infinite series on either side of the signal frequencies for the missing tuned circuits not to have a serious effect. By this means the eight signal circuits all operate as if part of an infinite series but the guard is reduced at the middle and outer frequencies *fx*, *fy* and *fz* because of the three tuned circuits at those frequencies. Guard at these frequencies can be restored by using the outputs from the circuits as guard as described later.

A further improvement in guarding is obtained by subtracting from the guard voltage derived from the voltage input to the tuned circuits, a voltage which is proportional to the input signal current *i*. The opposing voltage may be obtained by amplifying and rectifying the voltage input to the amplifier which produces the signal current *i*. Preferably the rectifier produces a mean voltage output which for a two-frequency input results in an output proportional to the larger of the two inputs and is independent of frequency. The relative magnitudes of the two guard voltages are adjusted so that the required operating bandwidth is obtained on the lower of two inputs having maximum level difference. The result illustrated in FIG. 8 is that the guarding action outside the operating bandwidth is increased: it becomes greater as the opposing voltage is increased and can thus be made as large as desired up to the limit set by harmonics of the input signal frequencies which will operate the guard.

If the input level range exceeds that over which signal detectors will operate satisfactorily a compressing amplifier has to be used with the previously mentioned difficulty when the two components of a genuine signal occur with the maximum level difference between them. Outputs from the two signal tuned circuits are in similar proportion which in the limiting case may be taken as one being twice the other. The adopted solution to this difficulty is to use an amplifier of constant gain, i.e. non-compressing, until the input reaches a value equivalent to one signal frequency at its lowest level and the other at the maximum difference (6db.) above this level and for compression to start when this input is exceeded. The signal detectors must therefore operate over a range of at least 6db. and in practice 10–15db. is obtained. The maximum level range for public exchanges with up to 1,200 ohm loops is about 16db.: hence the compressor has to reduce level changes of about 16–6 =10db. to 4 or 5db. i.e. a compression ratio of 2 or 3 to 1 which is not difficult.

Figure 11:
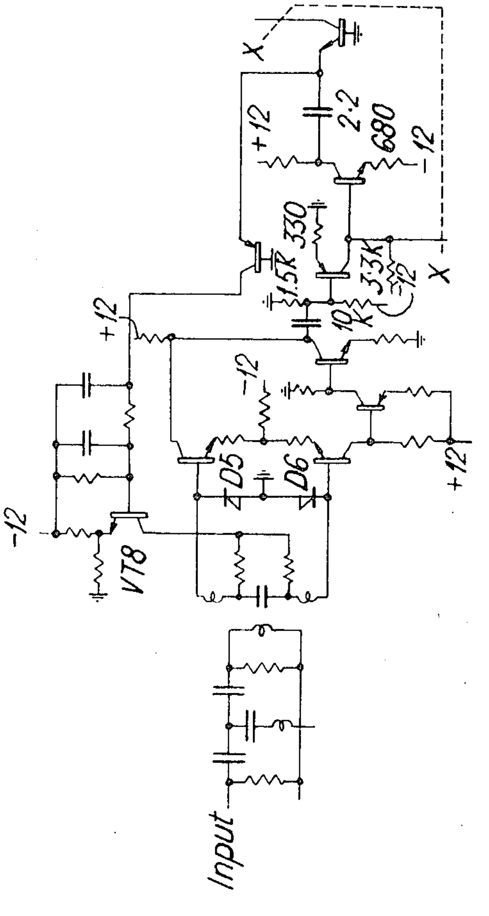
FIG. 11 is the circuit diagram of a compressing amplifier for use in the receiver of FIG. 10.

FIG. 11 shows a compressing amplifier conventional in that the output from the amplifier is rectified and divided equally through diodes D5 and D6 to reduce the amplifier gain as the output level rises. The amplifier is not conventional in that current through the diodes does not commence until a predetermined amplifier output is reached; this is caused by a bias voltage at the emitter of transistor VT8. This transistor provides control current for the diodes but not until the rectified output of the amplifier exceeds the bias voltage. This output is arranged to be that which occurs with one frequency signal at its minimal level and the other at a level 6db. above minimum.

Dial tone has to be sent at an adequate level and hence it will be reflected back into the exchange to be superimposed on an incoming press-button signal. The dial tone which has its maximum power at frequencies around 300–400 Hz. will have the maximum level into the receiver of −12db. compared with the lowest signal level of −15db. (electronic Pabx) or −12db. (public exchanges). A high pass filter to produce at least 12db. or 18db. loss respectively at 400 Hz. and practically zero loss at the lowest signal frequency (697 Hz. is thus required and as such it must contain at least one M− derived half section. A normal LC filter is shown on the diagram. An active filter without inductance is possible.

With the arrangements so far described any two (or more) frequencies can be operated simultaneously. The operation required is one frequency out of the group *f*1, *f*2, *f*3, *f*4 together with one out of the group *f*5, *f*6, *f*7, *f*8. A genuine signal will of course, provide only the required conditions but speech may operate any number of frequencies in either band. Note also that outputs from many tuned circuits may occur simultaneously and because the input levels vary over a large range the outputs will similarly vary and the detection level has to vary with the input level. The simplest arrangement is to take the outputs in two groups *fy*, *f*1, *f*2, *f*3, *f*4, *fx* and *fx*, *f*5, *f*6, *f*7, *f*8, *fz* and choose the highest output in each group. In this way not only is the detection level adjusted to the signal level but the frequencies *fx*, *fy* and fz which are eliminated from the normal guarding action produce a guard action by influencing the detection level. The guard circuit will set a limit to the level difference between the highest signals in the two groups. In these many ways operation to inputs having the characteristics of signals can be made very secure and operation to other inputs very difficult thus producing the most reliable receiver operation the least subject to false operation.

Many pax's and pabx's have extensions all within a single building and the variation of transmission loss between them is so small that a linear non-compressing amplifier suffices for press-button VF reception from all the extensions. FIG. 10 is a circuit diagram of such a receiver. When the variation of loss, in existing public exchanges for example, exceeds the capabilities of FIG. 10 a compressing amplifier to FIG. 11 can be substituted for the linear amplifier as shown by the dashed line XX. FIG. 10 contains a number of inductors which at present are constructed using ferrite cores which are bulky and expensive. Eventually when integrated circuit gyrators are available the inductors may each be replaced by a gyrator and a capacitor. A discrete component gyrator is shown in FIG. 12 and may be used instead of the inductors if desired.

Details of the design of FIG. 10 are given in the following paragraphs.

The upper part of FIG. 13(*a*) shows the essential output of the detector circuits to work into integrated logic circuits to comprise a transistor VT1 with its emitter earthed and its collector joined through a resistor to the +5.5 voltage rail appropriate to integrated circuits. The normal output logic level is 0 corresponding to the transistor being bottomed which occurs due to base current through a 22 K. resistor to the +5.5 voltage rail. The transistor when cut off produces the logic 1 output. Cut off occurs when sufficient current is drawn down the base resistor by a capacitor which has current taken out of it by transistor VT2 on the peaks of the AC voltage wave-form across the tuned circuit inductor L. The emitters of the transistors of a group of tuned circuits are commoned to a resistor R1 which is shunted by a capacitor C1 which is charged by the emitter currents and discharges at a rate slow by comparison with the period of the lowest received frequency. The voltage across C1 becomes very nearly equal to that of the peak of the highest signal by which means only that signal in each group of frequencies which is producing the highest voltage output becomes detected. Two components in speech of approximately equal amplitude and at signal frequencies within one band may produce two outputs from one band for which reason by logical gating of the receiver more than one output is caused to inhibit the reception of a signal.

Three practical difficulties arise with the circuit as shown in FIG. 13(*a*) (1) the current through the transistor VT2 is in short pulses of high current which reflects into the base circuit to cause intermittent loading of the turned circuit. This produces spikes at the common input to the tuned circuit which being the point at which the guard circuit is connected produces false guard voltages (2) the AC input to the base of the transistor is liable to exceed on the negative peaks the maximum reverse voltage permissible between the base and the emitter, (3) transistor VT2 is bottomed on the highest received signal level if the detector operates on the lowest received level: this clamps the inductor L voltage, reflects back into the input and operates the guard.

To overcome these difficulties components are added to the circuit as shown in FIG. 13(*b*) referred to by the reference character 130. The transistor VT3 is interposed between the inductor and the transistor VT2 and a small resistor placed in series with the capacitor C1. The peak current is limited by the small resistor and the base current of VT2 still further reduced to base current at VT3 to reduce the load on the tuned circuit. A diode D1 in series with the emitters of VT2 and VT3 protects the emitters from reverse voltage, leak resistors from the emitters to the output of the tuned circuit overcoming the effects of electrode capacitance to ensure the potentials of the emitters on reverse voltage. A potential divider comprising resistors R2 to R5 provides a voltage across R2 to which the collectors of VT2 and VT3 can clamp via diodes D2 whereby the transistors do not bottom until the input signal exceeds the clamping voltage. In this way the maximum level range over which the detectors are effective is ensured and is further enhanced by positive bias via the tuned circuit inductor using voltage across resistors R4 and R5, the positive bias providing partial compensation for the base emitter drops of the transistors VT2 and VT3 and diodes D1. The bias across resistor R5 is applied to the guard tuned circuits which have one fewer semi-conductor device in series.

Guard from the guard circuit is applied as current through resistor R1 thereby raising the potential of capacitor C1 to exceed the signal voltages in order to inhibit the operation of the detector circuits. FIG. 15 is a block diagram of a preferred embodiment of my invention. In that figure, I show a common input fed through a suitable dial tone, high pass filter to the dual amplifiers 140. The amplifier sections each produce an output, a first on conductor 142 to the three guard band-pass filters *fx*, *fy* and *fz*, the other on conductor 144 to the guard filters (shown in detail in FIG. 14) and to the individual filters for the signal tones, of the two tone groups in multiple. The outputs of the signal tone filters are fed to individual detector circuits 130 whose function will be described in greater detail relative to FIG. 13*b*. The outputs of the guard filters are connected through individual diodes for the respective *fx*, *fy* and fz guard frequencies. The connection from filter Fy is connected to a commoned output from the low frequency signal detectors at lead 152, from *fz* to the high frequency signal detector outputs on lead 154 and from filter Fx to both groups in parallel. Each group multiple feeds a shunt combination of resistor R1 and capacitor C1, as will be now described with respect to the more detailed showing of FIG. 10.

The circuit 130 and its components shown in FIG. 13(*b*) can be traced in FIG. 10.

As shown in FIG. 10 all the tuned circuits have a common input as required by the design of the receiver. There are two groups of signal tuned circuits with a guard tuned circuit at 1,065 Hz. between them and outer end guard circuits at 631 and 1805 hz which all together are equivalent to an infinite series of tuned circuits in parallel as previously described.

The outputs of the detector circuits are in two groups which can operate independently except for the guard which is applied to both equally. The outputs from the guard circuits at 631 and 1,065 Hz. together with the outputs from the signal circuits at 691, 770, 852 and 941 Hz. forms one group and a duplicate output from the 1,065 Hz. guard, the 1805 Hz. guard and the 1,209, 1,336, 1,477 and 1633 Hz. signal circuits form the other group. The outputs from the signal detector circuits are applied to integrated circuit logic units not shown in FIG. 10.

The capacitors of the tuned circuits are high stability types which can be purchased with an accuracy better than 1 percent. The inductors must have a Q of at least 25 and can be manufactured to an accuracy of 2 or 3 percent. The overall accuracy of tuning required is better than 1 percent hence adjustment has to be made. With ferrite cored inductors a screw adjusting slug is provided and can be operated with a screwdriver.

Bridge methods of measuring the tuned circuits and methods requiring voltages or currents to be measured are relatively insensitive. Phase is the quantity which is changing at the most rapid rate around the resonance frequency and this provides the best method of detecting resonance. An oscilloscope has the X and Y plates brought out through amplifiers which can be applied, one to measure the current being supplied to the tuned circuits and the other to measure the resulting voltage applied to the tuned circuits. These quantities can be obtained as shown dotted in FIG. 10 from the emitter and collector voltages of the transistor supplying current to the tuned circuits. With an input at one of the signal frequencies, the gains of the amplifiers can be adjusted so that the X and Y deflections are approximately equal. At resonance the current and voltage are in phase which produces a straight line on the oscilloscope screen. Away from resonance an ellipse appears on the screen. The procedure is as follows:

The signal frequencies and the three guard frequencies are applied in turn. At each frequency the inductor of the circuit resonant at that frequency is adjusted to produce the straightest line trace on the screen. The advantage of this method is that the oscillator connexions do not have to be changed as the adjustment proceeds. Its disadvantage is that the signal frequency voltage is attenuated by the signal circuit but the harmonics of the signal frequency are not. The harmonics thus make what should be a straight line a wavy line. If, because of this, the test is too difficult to interpret the alternative is to use the voltages across the inductors in turn which is less convenient because connexions have to be changed for each test. At resonance the voltage across the inductor has a phase which is at right angles to that of the input current thus producing an ellipse which should be a circle but is not very easily maintained as such. The test in this latter case is that of the best ellipse with its axes vertical and horizontal on the screen. Adjustment of one tuned circuit has a slight effect on the adjacent tuned circuits for which reason it is preferable to go through each of the tuned circuits in order twice. This method has been found to be very accurate, certainly to within 0.2 percent. Assuming that the test oscillator is accurate to within 0.1 percent an overall accuracy of 0.3 percent can be assumed. Adding the press-button oscillator frequency tolerances of 1.5 percent means that the operating bandwidth of the receiver as measured should be at least ±1.8 percent.

A similar method of testing the tuning of a signal and guard circuits may be used when the inductors are replaced with gyrators. With the discrete component gyrator of FIG. 12 the inductors can be varied by varying the loop gain which may be accomplished by providing resistor R as a main resistor and an auxiliary of much higher resistance with which by choosing a suitable value fine tuning may be accomplished. With integrated circuit gyrators the equivalent inductance is determined by the external added capacitance which may consist of a main capacitor and an auxiliary fine tuning capacitor.

The dial tone filter is an m-derived high pass half section with a nominal cut-off frequency of 500 Hz. and a peak attenuation at 400 Hz. The filter is misterminated with a resistance greater than the nominal value in order to produce a peak of transmission at 500 Hz. where strong guarding frequencies exist.

The output of the filter is applied to the inputs of two amplifiers, one feeding current into the tuned circuits and the other feeding current which is rectified to mean half wave current which is applied to the guard circuit.

The guard circuit referenced by numeral 140 shown in FIG. 14 extracted from FIG. 10 has two inputs: one is the voltage existing at the common input to the tuned circuits and the other is a halfwave rectified version of the current applied to the same point. The first is applied directly to the base of transistor VT4, the second is smoothed to mean rectified current and the mean current amplified by transistor VT5. The voltage applied to VT4 is amplified by a factor $k$ and the resultant peak to peak voltage applied to the base of transistor VT6, the capacitor C2 and diode D3 producing the required peak to peak voltage. Because D3 is imperfect as a diode the voltage applied to VT6 is less than the expected peak to peak voltage on small signals and the transistor itself needs a minimum voltage for its current operation. For these reasons the diode D3 is positively biased. The leak resistor R6 necessary to discharge capacitor C2 normally draws the current through the diode to stabilise its voltage which would otherwise be dependent on the very uncertain base current of VT6. The peak current through VT6 controls the guard by producing voltage at the base of the emitter follower transistor VT7 which charges the capacitor in its emitter circuit, to the peak voltage. The capacitor voltage is applied to other transistors which produce current in the resistor R1 of FIG. 13 to oppose the operation of the detector circuits. The base emitter voltage drops of all the various transistors are a nuisance which is partially mitigated by the negative bias applied to the base of transistor VT7. The guard current issuing from VT6 is the quotient of the voltage applied to the base and the emitter resistor R7 less any current supplied from the collector of VT5. The arbitrarily chosen objective of the design is that for a single input to the receiver at a signal frequency the guard current shall be just zero. The resulting conditions correspond to those of FIG. 8.

If the single frequency current applied to the tuned circuits is $i$ the mean half wave rectified current is $i/\pi$. This is multiplied by a factor $j$ by a transistor VT5, which current produces a voltage in resistor R7 equal to $ijR7/\pi$. The current $i$ produces a voltage $i\omega L/Q$ ($\omega=2\pi f$) at the base of VT4 which after amplification becomes a peak voltage equal to $i2kwL/Q$.

Hence it is required that $ijR7/\pi=i2kwL/Q$ or $jR7/k=2\pi\omega L/Q$. In the circuit $\omega L=7500$ and a $Q$ of 20 is assumed. Hence $jR7/k=2{,}350$ $k$ is fixed at about 4.4 to provide voltages of suitable magnitude at the base of VT6. For R7, 2.2 K. ohms is suitable. Hence $j$ becomes 4.7. This calculated value would produce an operating bandwidth of ± 2 percent if all components were at their nominal values. To cover inaccuracies in the components which might otherwise produce too small a bandwidth the factor $j$ is made 50 percent larger than the normal value. It is not to be expected that with so many components involved in the signal and guard arrangements that a close bandwidth tolerance near to ± 2 percent could be obtained without special adjustment. It is nevertheless clear from inspection of FIG. 8 that curves 3 and 4 can be moved vertically (corresponding to component tolerances) quite a lot without ± 2.5 percent bandwidth being exceeded. On this basis the negative guard produced by transistor VT5 is preferably larger rather than smaller than the design figure, which it can exceed quite considerably without serious effect on the operating bandwidth.

The resistors R8 and R9 are chosen to overload the rectifier above the largest signal level but before the guard signal overloads. The diode D4 compensates for the emitter base drop of VT5, an important detail when the input is small.

High speech levels will overload the amplifier, the signal and guard circuits. It is important that the guard circuit be the last to overload in order to preserve protection against speech operation.

What we claim is:

1. A signal imitation guard arrangement for a receiver in a voice-frequency signalling system using for each signal two frequencies one from each of two bands of four frequencies having a common ratio between adjacent frequencies, in which said receiver includes in its input stage a high impedance amplifier feeding in parallel a series of resonant circuits which include circuits each resonant at spaced apart frequencies in said two bands of frequencies, a circuit resonant at the frequency which is approximately midway between the frequencies of said bands, a further circuit resonant at a frequency spaced below the lowest frequency of the lower frequency band, and another circuit resonant at a frequency spaced above the higher frequency band, in which a guard voltage is derived from the alternating voltage appearing across the input to the resonant circuits and is opposed to the signal voltages appearing across the outputs of said resonant circuits.

2. An arrangement as claimed in claim 1, in which the receiver is preceded by an amplifier having constant gain until the input is such that one signal frequency is at its lowest level, and the other signal frequency is at its maximum allowable difference above this level, said amplifier becoming a compressing amplifier above said allowable maximum.

3. A signal imitation guard arrangement for a receiver in a voice-frequency signalling system using frequencies selected from two bands of frequencies, in which said receiver includes in its input stage a high output impedance amplifier feeding in paralleled a pseudo-infinite series of resonant circuits which includes signal circuits each resonant at one of the frequencies used in signalling, means at the input to the receiver for producing a guard voltage derived from the alternating voltage appearing across the input to the pseudo-infinite series of resonant circuits and means for connecting said guard voltage to oppose the signal voltages appearing across the outputs of said signal resonant circuits, and in which said pseudo-infinite series of resonant circuits comprises resonant circuits one for each of the signalling frequencies to be used, an ancillary resonant circuit which is resonant at a frequency which is approximately midway between the lowest frequency in the higher frequency band and the highest frequency of the lower frequency band, and further ancillary resonant circuits at the outer ends of the two frequency bands, which further circuits approximate an infinite series in either side of the bands.

* * * * *